Jan. 19, 1954
G. G. LANDIS ET AL
2,666,832
COMBINED WELDING HEAD AND FLUX
HOPPER FOR CONTINUOUS WELDING
Original Filed May 22, 1947
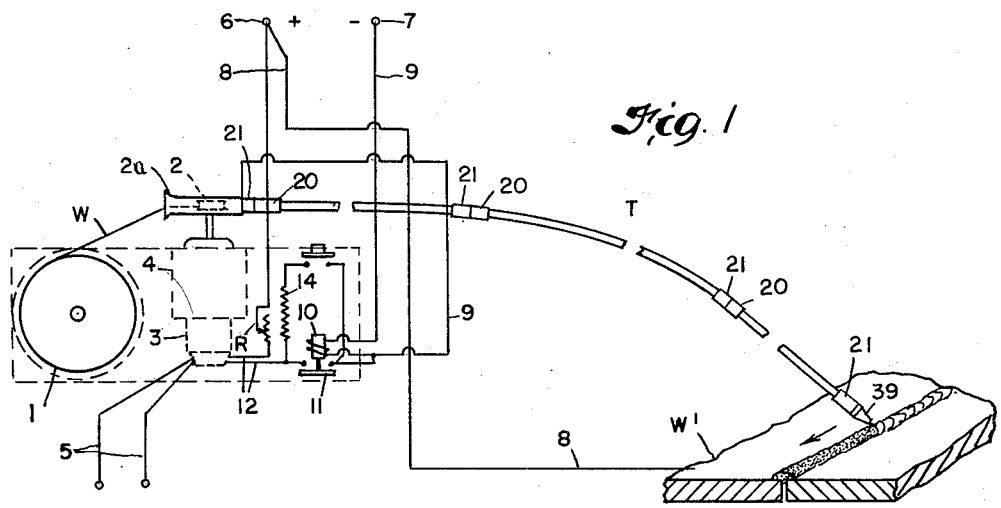
Fig. 1
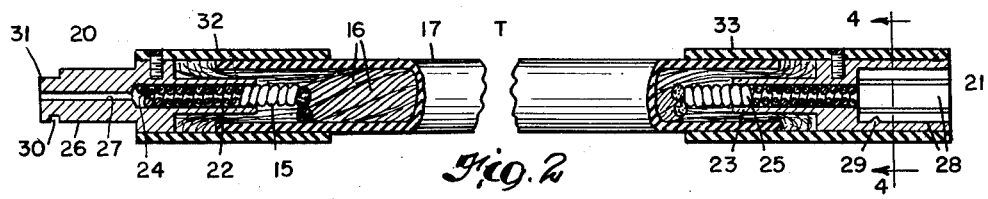
Fig. 2
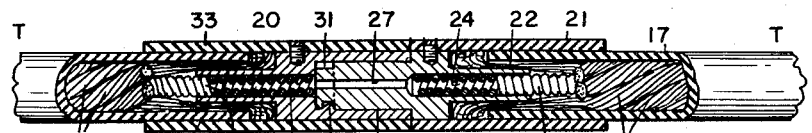
Fig. 3
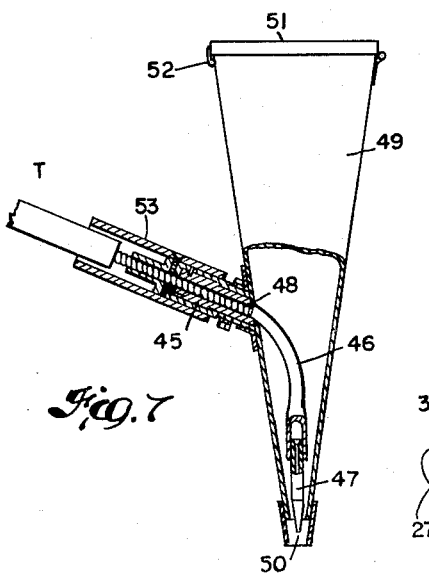
Fig. 7
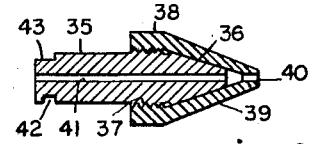
Fig. 4
Fig. 6
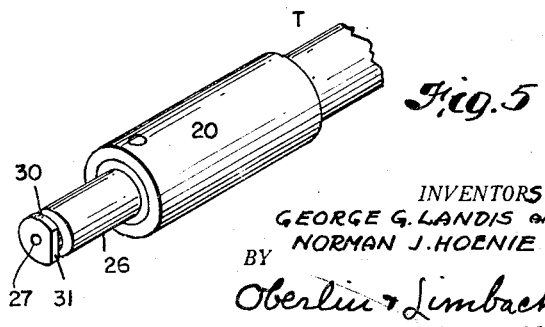
Fig. 5
INVENTORS
GEORGE G. LANDIS AND
NORMAN J. HOENIE
BY
Oberlin & Limbach
ATTORNEYS.

Patented Jan. 19, 1954

2,666,832

UNITED STATES PATENT OFFICE 2,666,832

COMBINED WELDING HEAD AND FLUX HOPPER FOR CONTINUOUS WELDING

George G. Landis, South Euclid, and Norman J. Hoenie, Cleveland Heights, Ohio, assignors to The Lincoln Electric Company, Cleveland, Ohio, a corporation of Ohio Original application May 22, 1947, Serial No. 749,780, now Patent No. 2,536,294, dated January 2, 1951. Divided and this application October 22, 1949, Serial No. 123,046

3 Claims. (Cl. 219—8)

1

Certain improvements, more particularly relating to a method of arc welding by means of a continuously fed, small diameter weld rod or wire of indefinite length are disclosed in our Patent No. 2,444,834, dated July 6, 1948, and the present weldrod feeding mechanism forms one feature of an improved apparatus for carrying out such method disclosed in our pending application filed May 22, 1947, Serial No. 749,780 (now Patent No. 2,536,294, dated January 2, 1951) of which the present application is a division.

The present invention contemplates and has for its principal object an improved form of welding tool which is in effect merely a terminal portion of the conductor through which the weld rod or wire is directly guided to the work, such tool being adapted for convenient manual operation.

In accordance with the present invention, arc-welding apparatus is provided wherein a metallic electrode in the form of a wire is fed continuously toward a workpiece comprising, in combination, means for feeding the electrode from an electrode source toward the workpiece, including a terminal fitting in electrical contact with the electrode, means for electrically energizing the fitting and a flux-discharge nozzle attached to and surrounding the fitting, the nozzle being electrically insulated from and extending beyond said fitting, whereby flux may be deposited on a workpiece adjacent the electrode end and the fitting will be electrically insulated from the workpiece when the welding operations are not being performed.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a more or less diagrammatic representation of one form of apparatus, useable with the present invention;

Fig. 2 is partially a central sectional view and partially a side elevation of one of the component sections of the flexible tubular guide for guiding the electrode from an electrode source toward a workpiece;

Fig. 3 is similarly partially a central sectional view and partially a side elevation of the ends of two such sections showing the manner in which they are adapted to be coupled together;

Fig. 4 is a transverse section through one such coupling member, the plane of the section being indicated by the line 4—4, Fig. 2;

Fig. 5 is a perspective view of the complementary coupling member;

Fig. 6 is a central sectional view of the terminal member which forms the welding tool when attached to the coupling member illustrated in Fig. 4; and Fig. 7 is a central sectional view of a terminal member illustrating an embodiment of the invention which includes an attachment whereby granular fluxing material may be supplied to the work-piece at the point of welding.

Referring to the illustrative apparatus shown in Fig. 1, the weld rod or wire W is shown as being drawn from a reel 1 by means of gripping rolls 2 in conventional manner, only one of which appears in said figure. However, as more fully set forth in our above-identified patent, in our improved method or process the weld rod or wire employed is of relatively small diameter, e. g. $\frac{1}{16}$ inch to $\frac{5}{64}$ inch, and comparatively high rates of feed are required, e. g. approximately 300 inches per minute for such $\frac{1}{16}$ inch D. wire and only slightly less for the $\frac{5}{64}$ inch D. wire. Gripping rolls 2 are driven by motor 3 through a reduction and change speed gear box 4 whereby the rate of feed of the weld rod or wire W may be set, as indicated, for each of the several sizes or diameters of wire with which the apparatus is designed to be employed. Furthermore, the current employed is of such value in relation to the cross-sectional area of the weld rod or wire as to cause an arc to be established by reason of the substantially instantaneous fusion of the end of such rod whenever such end comes in contact with the workpiece.

Current is supplied to the field of motor 3 through leads 5, from a source of current independent of the welding current, e. g. from an ordinary 120 v. power line. The welding current may likewise be taken from any suitable source, e. g. from the terminals 6 and 7 of a welding machine (not shown), which will be provided with the usual means for varying the voltage and amperage of the current, as may be found desirable for any particular operation. However, it is not contemplated nor necessary that any changes in the setting of such machine, or in other words of the welding current, will require to be made during the welding operation, or in fact for any given set-up, i. e. any operation in which it has been determined at what rate the weld rod or wire is to be fed to the work and the current appropriate for the particular operation has been selected.

One of the aforesaid terminals, preferably the positive terminal 6, is connected by means of a lead 8 with the workpiece W', while the other, negative, terminal 7 is connected by means of a lead 9 with the conductor which forms a part of a flexible tubular guide T, as will be presently described.

Operation of the motor 3 is tied in with the welding operation by a series relay 10 which is operated by the welding current through the electrode lead 9 to close a switch 11 in one of the armature leads 12. In addition to this relay there is included in such armature lead a push button switch 13 which is adapted to connect the latter through a resistor 14. This last-mentioned switch is used to operate the motor to feed the wire manually when not welding, for example in initially threading the wire through the tubular guide T. An adjustable resistor R will also be desirably included in the other such armature lead 12, to permit the armature current to be set as desired.

As previously indicated, the flexible tubular guide T is preferably, although not necessarily, composed of sections, one of such sections being illustrated in Fig. 2. As there shown, the main guide element or liner 15, through which the weld rod or wire W directly passes when being fed to the work, consists of a laterally flexible, helically wound spring of hardened steel wire or equivalent wear-resisting material, the coils of which closely contact so as to maintain the tube walls closed despite any bending to which the tube may be subjected. Immediately surrounding, and in close electrical as well as physical contact with such inner tube 15, is a conductor sheath 16 formed of multi-stranded fine copper wire assembled and twisted about said inner tube, much as are the component strands in a wire cable. Conductor 16 is in turn surrounded with a heavy sheath 17 of rubber or equivalent flexible insulating material.

We have found that in a guide tube constructed as described, where the resistance of the liner 15 will greatly exceed that of the conductor sheath 16 (the latter may have a conductance several hundred times greater than the former) it becomes unnecessary to insulate the one from the other; in other words such sheath can directly contact such liner, without any consequential diversion of current thereto onto the wire, which in turn contacts with such liner. As a result the welding current is substantially entirely carried by the sheath to the terminal fitting (described later), where it enters the wire just before it emerges from the tubular guide.

From the foregoing it will be seen that not only has the construction of such guide been greatly simplified, but by eliminating the extra insulation, the handling of the guide is facilitated by reason of its increased lightness and flexibility.

It will be understood that the guide may consist of a single length of tube constructed otherwise as just described. Where a sectional construction the length of individual sections will be determined primarily by convenience in handling and storage, since by coupling together a suitable number thereof a guide of any required overall length may be provided. For the purpose of thus coupling the sections together, each thereof is provided at its one end with a male coupling member 20 and at the other with a complementary female coupling member 21. Each of said coupling members will be formed of highly conductive metal such as copper or brass, so as to constitute in effect a continuation of the conductor 16 that surrounds the flexible inner tube 15 of the guide. To insure effective electrical contact with the latter, the body of coupling member 20 is formed with a tubular extension 22 of reduced diameter and the body of coupling member 21 with a similar extension 23 that is adapted to receive in close surrounding relation the corresponding end portion of conductor 16, which will thus be bound, and preferably also brazed, thereto. At the same time the bores 24 and 25 of said tubular extensions are adapted to receive in tight fitting relation the corresponding ends of the inner flexible tube 15, which are similarly brazed thereto.

It will be noted that each end portion of conductor 16 not only fits over the corresponding tubular extension 22 of the corresponding coupling body, but also is enlarged so as to abut against the surrounding face of such body, whereby an adequate electrical connection is assured.

Coupling member 20 is provided with an oppositely directed heavier tubular extension 26, the bore 27 of which is of substantially equal diameter to that of said tubular member 15; while tubular member 21 is provided with a corresponding sleeve-like extension 28 which is longitudinally split and adapted to fit over and frictionally engage extension 26 of member 20. Said sleeve-like extension is further provided with an inwardly directed lug 29 that is adapted to interlock with an annular recess 30 adjacent the end of extension 26 on member 20, the outer wall of such recess being cut away at one point 31 to permit such engagement upon properly aligning the two coupling members and then turning one relatively to the other.

Each coupling member also respectively includes cylindrical shells 32 and 33 of insulating material which are firmly secured to the body portions of said members and overlie the corresponding ends of the flexible insulating layer 17 that surrounds conductor member 16. In the case of said insulating shell 33, it also projects in the opposite direction so as entirely to enclose the split sleeve extension 28 thereof. Accordingly, as illustrated in Fig. 3, when the complementary coupling members of two sections T of the flexible tubular guide are brought into proper end relation and interlocked by rotating the one relatively to the other, the respective insulating sleeves 32 and 33 will be brought into close, abutting relation and together with the flexible insulating layer 17 provide continuous insulation for the assembled sectional guide.

While the end of such guide to which the weld rod or wire W is fed by means of gripping rolls 2 may be permanently attached to the feed mechanism previously described, the exit end of the guide tube 2a associated with such rolls will preferably take the form of a female coupling 21, as described above, so that the flexible tubular guide may be entirely detached when desired. In any event, the outer end of the flexible tubular guide, irrespective of whether it comprises one or a plurality of sections, will be equipped with such female coupling member, in order to receive the terminal fitting illustrated in Fig. 6, which constitutes all that is required in the case of the present apparatus in the way of a welding tool.

This fitting comprises simply a tubular core 35, one end 36 of which is of conical form, said core being provided with external threads 37 at an intermediate point to receive a threaded shell 38 of insulating material. The latter has a conical extension 39 that is adapted when threaded in place on core 35 to closely fit the conical extension 36 of said core but project therebeyond, its extremity being provided with an opening 40 aligned with the bore 41 of the core. The opposite end of the latter is provided with an annular recess 42 which has a portion of its outer wall cut away at point 43 and otherwise corresponds with the body 26 of male coupling member 20.

Accordingly the fitting just described may, as stated, be received into a female member 21 at the end of any section of the conductor and upon rotative movement will be firmly secured thereto.

From the foregoing description it will be seen that, irrespective of the number of flexible tubular guide sections employed, the inner tubes 15 thereof will be aligned throughout with the bores 27 in the male coupling members 20 and with the bore 41 in the terminal fitting last described. Also the conductor member 16 will be continuously connected throughout the length of the guide through such coupling members and finally with the core of the terminal fitting. It has been found that no special provision for effecting electrical contact between such core and the weld rod or wire being fed through the guide is necessary, since such wire as drawn from the reel and fed through the guide will be necessarily undulated sufficiently to press against said core 35 at a sufficient number of points to insure the free flow of current to its extremity where the latter projects beyond the terminal fitting.

At the same time the construction and manner of coupling together the sections of the flexible tubular guide insure the exterior insulation thereof, no current-carrying element being exposed at any point throughout the length of the guide. Indeed the insulating shell 38 on the terminal fitting insures that the only live wire is the projecting end of the weld rod or welding wire itself.

In accordance with the invention, Fig. 7 shows a terminal member designed to deposit a layer of fluxing material along the line to be welded. To this end, in place of a terminal fitting comprising simply a tubular core 35 as illustrated in Fig. 6, such fitting comprises a core 45 of substantially the same construction and adapted to be connected in the same fashion to a male coupling member 20 of a flexible tube section; however, said core, instead of having a conical extension, carries an arcuately curved, rigid tube 46 which is fitted at its outer end with a straight nozzle 47. Either an extension or a separate section 48 of a flexible coil similar to coil 15 employed in the flexible guide sections T extends from member 45 to member 47 and provides the conduit through which the weld rod or wire W is guided to its point of emergence beyond said member 47.

Attached to said core member 45 is a light weight receptacle or hopper 49 of general conical form, the point of attachment being intermediate of the ends of said receptacle. At such point the curved wire guide member 46 enters the receptacle and thence extends downwardly so that the nozzle member 47 will be disposed centrally within the opening 50 at the lower end of the receptacle. As a result of the arcuate curvature of the guide member 46 and straight nozzle 47, not only is adequate electrical contact with the weld wire assured, but any kinks in the latter will be removed and it will be projected in axial alignment with such nozzle. A lid or cover 51 is desirably hingedly attached to the upper larger end of the receptacle and is provided with a snap catch 52 whereby such cover may be retained in closed position irrespective of the position of the receptacle.

In using such terminal member, assuming the same to be coupled to the end of a flexible tubular guide section T, the receptacle is filled with a powdered or granular fluxing material and when held in the position illustrated in Fig. 7 such material will be free to flow through opening 50 around nozzle member 47 and thus enable the operator to deposit a layer of such flux along the line to be welded simultaneously with the welding operation. For the purpose of manipulating the welding tool with associated flux hopper in the manner just described a sleeve 53 that surrounds core 45 provides a convenient handle. When it is desired to interrupt the welding operation, the arc being broken in the manner above described, the receptacle, without requiring to be detached, may be simply inverted and rested on its larger end which is closed by cover 55. Then upon resuming operation the position of the receptacle with the terminal member to which it is attached is simply again reversed to that shown in Fig. 7.

The operation of our improved arc-welding apparatus in its entirety may now be briefly set forth. After selecting the particular weld rod or wire with which it is desired to operate, the current is set so as to secure proper penetration of the workpiece by the arc. Thus, in the case of $\frac{1}{16}$ inch wire, with a current of from 150 to 350 amperes, penetration of from $\frac{1}{32}$ to $\frac{1}{8}$ inch may be secured, and with $\frac{5}{64}$ inch wire, with a current of from 200 to 500 amperes, penetration of from $\frac{1}{16}$ to $\frac{1}{4}$ inch may be secured. The wire feed mechanism is then set to feed the wire at the proper rate through the flexible tubular guide, and no subsequent adjustment of such feed rolls while operating under the conditions thus established will be required. Immediately upon striking the arc by contacting the end of the wire projecting beyond the welding tool with the workpiece, the wire feed is set in motion at such predetermined rate and the end of the wire which is thus kept advancing beyond the tool is melted down to form the usual bead. The arc is struck and preferably kept submerged under a relatively deep layer of granular flux, which at the same time as the bead is formed will be at least in part rendered molten and provide a protective covering for the highly heated weld metal. In order to interrupt the operation, it is merely necessary to break the arc by withdrawing the tool from the workpiece with a quick movement exceeding in speed the advancing movement of the wire. Or, by stopping the motor, the wire will automatically melt back to a point where the arc will no longer be sustained.

The simplicity of the foregoing operation will be obvious. At the same time, the manipulation of the weld rod through the medium of the tubular flexible guide T and the terminal fitting thereon which takes the place of the unwieldy weld tool heretofore in use is equally simple and convenient. The operator merely has to take hold of such terminal fitting, or rather of the insulated coupling member 20 adjacent thereto, and move such fitting, with the end of the wire protruding therefrom, along the line to be welded.

It will thus be seen that in conjunction with the flexible guide tube the specially designed fitting and associated hopper just described constitute a complete self-contained welding tool or "gun" which is ready for instant use by simply picking it up and striking an arc between the end of the electrode, that projects through the nozzle member 47, and the work-piece. Simultaneously the flux contained within the hopper will flow by gravity around the electrode and onto the seam being welded. Interruption of the welding operation is just as conveniently accomplished, and while the operation is thus interrupted if desired the body of flux within the hopper can be replenished by opening the cover at its larger end and by a simple scooping movement the hopper can be entirely filled from an adjacent source of supply such as a box or bin.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In quasi portable arc welding apparatus, wherein a metallic electrode in the form of a wire is fed continuously to the work, the combination of electrode feeding means, a flexible tube adapted to receive an electrode from said feeding means and guide the same to the work, a welding current lead, a portable welding head including a terminal fitting for said tube electrically connected with said lead and adapted to provide electrical contact with such electrode as it passes through said fitting, and a flux hopper carried by but electrically insulated from said fitting, said hopper having a flux discharge passage having a lower end, and said fitting being disposed in and terminating short of such end.

2. In arc-welding apparatus wherein a metallic electrode in the form of a wire is fed continuously to the work, the combination of electrode-feeding means, a portable welding head and a flexible tube adapted to receive an electrode from said feeding means and guide the same to the workpiece, said head including a terminal fitting for said tube adapted to be electrically connected with a power source and adapted to provide electrical contact with such electrode as it passes through said fitting and a flux hopper electrically insulated from said fitting, said hopper having a flux-discharge passage having a lower end, and said fitting terminating short of and within such end.

3. In arc-welding apparatus wherein a metallic electrode in the form of a wire is fed continuously to the work, the combination of electrode-feeding means, a flexible tube adapted to receive an electrode from said feeding means and guide the same to the work, a terminal fitting for said tube, means for electrically energizing said fitting, said fitting being adapted to provide electrical contact with such electrode as it passes through said fitting and a flux-discharge nozzle carried by but electrically insulated from said fitting, said nozzle having a lower end, and said fitting terminating short of and within such end.

GEORGE G. LANDIS.
NORMAN J. HOENIE.

References Cited in the file of this patent

UNITED STATES PATENTS

| Number | Name | Date |
|---|---|---|
| 1,707,433 | Hand | Apr. 2, 1929 |
| 1,953,915 | Burgett et al. | Apr. 3, 1934 |
| 2,336,732 | Howard | Dec. 14, 1943 |
| 2,375,656 | Jackson | May 8, 1945 |
| 2,478,525 | Cutrer | Aug. 9, 1949 |
| 2,510,204 | Baird | June 6, 1950 |

FOREIGN PATENTS

| Number | Country | Date |
|---|---|---|
| 394,773 | Great Britain | July 6, 1933 |